United States Patent Office 3,808,250
Patented Apr. 30, 1974

3,808,250
POLYETHERS CONTAINING TERMINAL AMINO GROUPS
Johannes Blahak, Erwin Müller, Helmut Kleimann, and Cornelius Mühlhausen, Leverkusen, Germany, assignors to Bayer Aktiengesellschaft, Leverkusen, Germany
No Drawing. Filed Apr. 16, 1971, Ser. No. 134,841
Claims priority, application Germany, Apr. 22, 1970,
P 20 19 432.5
Int. Cl. C07c 153/07
U.S. Cl. 260—455 R    7 Claims

ABSTRACT OF THE DISCLOSURE

Compounds having terminal amino groups and the general formula

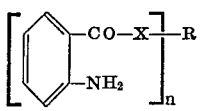

wherein n is an integer of from 2 to 8,
X is oxygen or sulphur, and
R is an n-valent radical obtained by the removal of hydroxyl groups or mercapto groups from an n-valent polyalkylene ether polyol of molecular weight 600 to 10,000 or from an n-valent alkylene thioether polythiol of molecular weight 600 to 10,000.

These compounds are prepared by reacting polyols with isatoic acid, anhydride and are useful in reaction with organic polyisocyanates to prepare all type of polyurethane polymers.

---

The reaction of polyamines which contain terminal amino groups with polyisocyanates yields polyadducts containing urea groups, which products have numerous remarkable advantages compared with polyurethanes which are obtainable from polyols and polyisocyanates. In particular, the polyureas differ from correspondingly structured polyurethanes in their higher thermal resistance and better tensile strength and structural strength. Higher molecular weight polyether polyols known from polyurethane chemistry, in particular higher molecular weight polyether polyamines, are suitable reactants for polyisocyanates for the production of polyureas. There has, therefore, been no lack of attempts to prepare such polyethers which contain terminal amino groups. Thus, for example, according to U.S. patent specification 2,888,439, polyethers which contain terminal hydroxyl groups are reacted with p-nitrophenyl isocyanates, and the resulting p-nitrophenylurethanes are reduced to the corresponding amino compounds. According to German patent specification 1,257,427, compounds which contain terminal hydroxyl groups are reacted with azo aryl isocyanates and thereafter hydrogenated to the corresponding amino compounds. According to German patent specification 1,270,046, preparation of compounds which contain terminal amino groups is carried out by reacting polyalkylene glycol ethers with di- or triisocyanates followed by reacting the resulting compounds which contain terminal isocyanate groups with secondary or tertiary carbinols and decomposing the resulting compounds by means of heat.

The above-mentioned processes for the preparation of compounds which contain terminal amino groups are multistage processes which, for this reason alone, have only become established to a limited extent in practice. The present invention relates to a single stage process for the preparation of polyethers and polythioethers which contain terminal amino groups which process consists in that isatoic acid anhydride is caused to act on polyethers or polythioethers which contain terminal hydroxyl or mercapto groups under the catalytic action of strong bases. The new polyethers and polythioethers containing terminal anthranilic acid ester groups which can be obtained by this simple method are valuable intermediate products for the production of synthetic resins by the isocyanate polyaddition process.

The present invention thus relates to a process for the preparation of organic compounds which contain terminal amino groups, which compounds may be represented by the general formula:

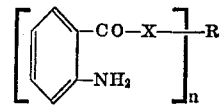

in which n is an integer of from 2 to 8,
X represents oxygen or sulphur, and
R represents an n-valent radical which may be obtained by the removal of hydroxyl or mercapto groups from an n-valent polyalkylene ether polyol or from a polyalkylene thioether polythiol, which process is characterized in that compounds of the general formula

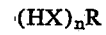
(HX)$_n$R of molecular weight 600 to 10,000 are reacted with at least n equivalents of an isatoic acid anhydride in the presence of strong bases.

The present invention also relates to compounds of the general formula

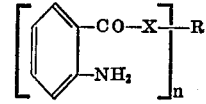

which contain terminal amino groups, in which formula n represents an integer of from 2 to 8,
X represents oxygen or sulphur, and
R represents an n-valent radical such as can be obtained by the removal of hydroxyl groups or mercapto groups from an n-valent polyalkylene ether polyol of molecular weight 600 to 10,000 or from an n-valent alkylene thioether polythiol of molecular weight 600 to 10,000.

The present invention also relates to the use of compounds of the general formula

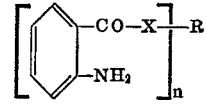

containing terminal amino groups, in which formula n, X and R have the meanings indicated above.

as reactants for polyisocyanates in the production of synthetic resins by the isocyanate polyaddition process.

The preparation of the polyethers and polythioethers according to the invention which contain terminal amino groups is carried out quite simply by heating a mixture of the polyether or polythioether used as starting material with at least two equivalents of isatoic acid anhydride in the presence of strong bases to temperature of 30 to 150° C., preferably 45 to 130° C. The reaction may be carried out in the presence or the absence of inert solvents. The quantity of catalyst used may vary within wide limits. Preferably, 1 to 10 parts by weight of the basic compound is used per 100 parts by weight of isatoic acid anhydride. The reaction is finished when evolution of gas ceases. Catalyst and excess isatoic acid anhydride may, if desired, be removed by filtration after the addition of inert solvent, and the resulting end product can be obtained pure by treatment with $CO_2$, extraction with water and drying under vacuum with stirring. For numerous purposes, however, simple filtration of the aminopolyether under pressure is sufficient.

Starting products suitable for the process according to the invention include any polyether polyols and polythioether polythiols as well as polyols and polythiols in the molecular weight range of 600 to 10,000 preferably 800 to 5000, which have both polyether and polythioether segments. For the process according to the invention, it is preferred to use polyether polyols which are free from sulphur, in particular polymers of ethylene oxide, propylene oxide or tetrahyrofuran or polyether polyols which contain ethylene oxide and propylene oxide units in any sequence. Polyether polyols of this type can be obtained by known methods. Thus, for example, the preparation of polyalkylene polyethers is preferably carried out by polymerizing the corresponding alkylene oxides, e.g. ethylene oxide or propylene oxide, in the presence of suitable starter molecules such as water, low molecular weight polyols, or low molecular weight amines which contain at least two nitrogen-hydrogen bonds. Low molecular weight polyols which are suitable for use as starter molecules include e.g. ethylene glycol, propane-1,2-diol, tetramethylenediol, hexamethylene diol, glycerol, trimethylolpropane, pentaerythritol, methylglucoside, cane sugar etc. In the process according to the invention, it is especially advantageous to use difunctional or trifunctional ethers such as those obtained e.g. by the reaction of alkylene oxides with divalent or trivalent representatives of the above-mentioned low molecular weight polyols. Also suitable for use as starter molecules are, for example, low molecular weight amines which contain at least two nitrogen-hyrogen bonds, e.g. ammonia, methylamine, butylamine, aniline, diaminobenzene, diaminotoluene, ethylene diamine, $\beta,\beta'$-dihydroxy-N-stearoyl-diethylamine, $\beta,\beta'$-dihydroxy-N-oleic-diethylamine etc.

Any strongly basic compounds can be used as catalysts for the process according to the invention. It is advantageous to use alkaline earth metal hydroxides such as calcium hydroxide, strontium hydroxide or barium hydroxide, but especially alkali metal hydroxides such as lithium hydroxide, sodium hydroxide, potassium hydroxide, rubidium hydroxide or caesium hydroxide. The use of sodium hydroxide as catalyst is especially advantageous.

Any inert solvents capable of dissolving the starting materials and end products may be used as solvents during the reaction or as solvents required for working up the reaction mixture in cases where the reaction is carried out without solvents. The following are mentioned as examples: methylene chloride, trichloroethylene, tetrahydrofuran, dioxane, methyl ethyl ketone, methylisobutyl ketone, ethyl acetate, isobutyl acetate, etc.

The following are typical examples of the new compounds containing terminal amino groups which can be prepared by the process according to the invention:

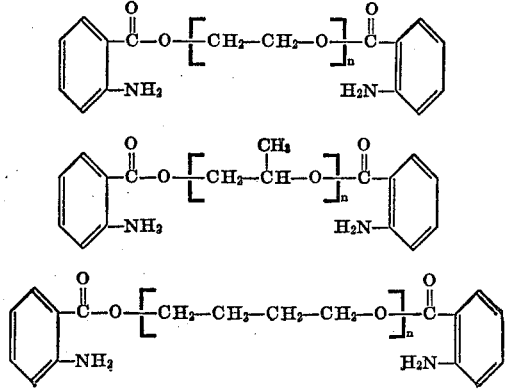

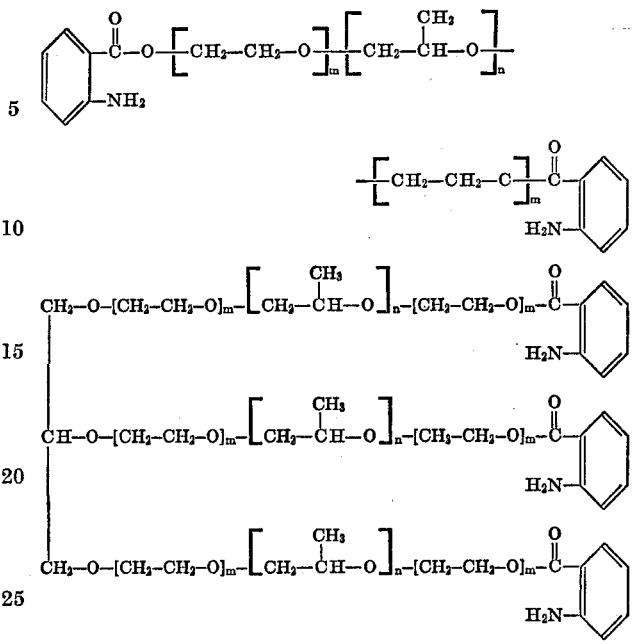

In these formulae, $n$ and $m$ always represent integers having such values that the molecular weights of the compounds will lie within the range of about 850 to 10,000.

The production of synthetic resins from the new compounds according to the invention by the isocyanate polyaddition process may be carried out by any of the methods already known in polyurethane chemistry, i.e. for the reaction of poly-hydroxyl compounds with polyisocyanates. This means that the reaction of the new compounds with polyisocyanates may be carried out in the presence of any of the additives known in polyurethane chemistry, e.g. catalyst, flame retarding substances, etc.

For the production of elastomeric synthetic resins, synthesis of the polyadducts is advantageously carried out in the presence of low molecular weight compounds which contain at least two hydrogen atoms that are reactive with isocyanate groups. Chain lengthening agents of this type are, for example, glycols which have a molecular weight of up to 500 or diprimary diamines having a molecular weight of up to 500. In the production of synthetic resins using the new compounds according to the invention it is preferable to use low molecular weight diprimary diamines as chain lengthening agents.

Suitable chain lengthening agents are, for example, tetramethylene diamine, hexamethylene diamine, octamethylene diamine, 2,4-diaminobenzene, 1,4-dichloro-3,5-diaminobenzene, 2,4-diaminotoluene, 2,6-diaminotoluene, 4,4'-diaminodiphenyl methane or 4,4'-diaminodicyclohexylmethane, 4,4' - diamino-3,3'-dichloro-diphenylmethane, isobutyl 4-chloro-3,5-diaminobenzoate, etc.

The polyisocyanates used for the preparations for polyadducts using the new compounds according to the invention may be any polyisocyanates known in polyurethane chemistry, e.g. tetramethylene diisocyanate, hexamethylene diisocyanate, 2,4-diisocyanatotoluene, 2,6-diisocyanatotoluene, mixtures of these isomers, 4,4'-diisocyanatodiphenylmethane, etc.

The polyadducts produced with the new compounds according to the invention are differentiated from similarly constructed polyurethanes by numerous remarkable advantages as already mentioned above.

The invention will be further illustrated by the following examples.

EXAMPLES

Example 1

97.8 g. of isatoic acid anhydride (0.6 mol) are heated to 90 to 100° C., together with 241 g. of polytetrahydrofuran (0.25 mol) and 2.7 g. of powdered sodium hydroxide. The reaction is completed by briefly heating to 130° C. 250 ml. of methylene chloride are added to the reaction mixture and the mixture is filtered. 500 ml. of water are then added and $CO_2$ is introduced to effect complete removal of sodium hydroxide. Lastly, the reaction product is extracted three times, each time with 500 ml. of $H_2O$, and the last residue of water are finally removed together with the methylene chloride in a rotary evaporator. Yield: 282 g. of a honey yellow, viscous substance which has a bluish fluorescence (88% of the theory).

1.6055 g. ≙ 23.8 ml. of N/10 $HClO_4$ in glacial acetic acid
3.6485 g. ≙ 54.0 ml. of N/10 NaOH (OH number method, see Houben-Weyl XIV/2, 17 (1963)).

The terminal OH groups of the starting material have thus been completely converted into anthranilic acid ester since the number of amino groups determined by titration corresponds with the value obtained by the OH number method for the sum of amino and hydroxyl groups.

Example 2

76 g. of isatoic acid anhydride (0.465 mol) and 843 g. (0.211 mol) of polypropylene oxide which has predominantly primary end groups as a result of grafting 15% by weight of ethylene oxide are treated as described in Example 1. 15 g. of finely powdered sodium hydroxide are used as catalyst. Yield 840 g. (approximately equal to 92% of the theory) of a yellow viscous substance which has a blue fluorescence.

5 g. ≙ 23.8 cc. of N/10 $HClO_4$: theoretical value: 23.6 cc. N/10 $HClO_4$.

The terminal OH groups are therefore completely bound.

Example 3

2000 g. of polypropylene glycol (1 mol), 359 g. of isatoic acid anhydride (2.2 mols) and 25 g. of powdered sodium hydroxide are heated together with stirring. The reaction starts at 65° C. and is completed at a temperature of about 100° C. The product is worked up as described in Example 1. Yield 1926 g. (=83% of the theory).

2.00 g. ≙ 17.6 cc. N/10 $HClO_4$
7.00 g. ≙ 6.15 cc. N/1 NaOH, corresponding to complete ester formation.

Example 4

Esterification of a polyether glycol of 30% of hexane diol and 70% of thiodiglycol having an average molecular weight of 1400—500 g. (0.357 mol) of polythioether, 122 g. (0.75 mol) of isatoic acid anhydride and 8 g. of powdered sodium hydroxide are treated with stirring as in Example 3 and worked up. Yield 573 g. (=93% of the 24.4 cc. of N/10 $NClO_4$, corresponding to complete theory). Titration of the primary $NH_2$ group: 2.00 g. ≙ esterification.

Example 5

2300 g. (0.75 mol) of a trifunctional polyether prepared by propoxylation followed by ethoxylation (proportion by weight of alkylene oxides=55:45) of glycerol are reacted with 456 g. (2.82 mols) of isatoic acid anhydride and 19.9 g. of powdered sodium hydroxide at temperatures of 85° to 105° C. The product is worked up in a manner analogous to Example 1. Yield 2308 g. (approximately=to 90% of the theory).

Found:
2 g. ≙ 17.5 cc. N/10 $HClO_4$ in glacial acetic acid
2 g. ≙ 17.55 cc. N/10 $HClO_4$ in glacial acetic acid (theoretical).

Example 6

688 g. (1 mol) of a trifunctional polyether consisting of ethylene oxide which has been polymerized on trimethylol propane are reacted with 538 g. (3.3 mols) of isatoic acid anhydride and 15 g. of sodium hydroxide in a manner analogous to Example 1 and worked up. Yield 825 g. ( 79% of the theory).

Found:
0.5 g. ≙ 13.75 cc. N/10 $HClO_4$
0.5 g. ≙ 14.8 cc. N/10 $HClO_4$ (theoretical).

It follows that in this case 93% of all the OH groups originally present have been converted into anthranilic acid ester.

Example 7

200 g. (0.0894 mol) of an aminopolyether of isatoic acid anhydride and polypropylene oxide are stirred for 60 minutes at 50 to 60° C. after the addition of 38 g. (0.219 mol) of tolylene diisocyanate (80% 2,4-isomer, 20% 2,6-isomer). The temperature is then raised to 90° C., and after brief removal of air in a vacuum produced by a water jet pump, 20.5 g. of 1,4-dichloro-3,5-diaminobenzene are added. After 24 hours' heating, an elastomer which has the following properties is obtained:

Tensile strength _____ 202 kg. wt./cm.$^2$.
Dimensional stability _____ 30 kg. wt. (Ring).
Shore hardness, DIN 53505 _____ 93.
Elasticity, DIN 53512 _____ 39.

A polyurethane elastomer which has the following properties is obtained from the free polyether after appropriate reaction:

Tensile strength _____ 77 kg. wt./cm.$^2$.
Dimensional stability _____ 16 kg. wt. (Ring).
Shore hardness, DIN 53505 _____ 79.
Elasticity, DIN 53512 _____ 45.

Example 8

The procedure is the same as in Example 7, the following substances being used in the given quantities: 210 g. (0.17 mol) of polypropylene oxide dianthranilate obtained from polypropylene oxide of molecular weight 1000, 50 g. of the mixture of diisocyanatotoluene isomers used in Example 7 and 18.7 g. of 1,4-dichloro-3,5-diaminobenzene.

Tensile strength _____ 226 kg. wt./cm.$^2$.
Dimensional stability _____ 39 kg. wt. (Ring).
Shore hardness, DIN 53505 _____ 97.
Elasticity, DIN 53512 _____ 28.

A polyurethane elastomer having the following properties is obtained from the free polyether after appropriate reaction:

Tensile strength _____ 13 kg. wt./cm.$^2$.
Dimensional stability _____ 6 kg. wt. (Ring).
Shore hardness, DIN 53505 _____ 62.
Elasticity, DIN 53512 _____ 22.

Example 9

306 g. (0.175 mol) of polytetrahydrofuran dianthranilate are reacted with 51.5 g. of toluylene diisocyanate at 60 to 70° C. After 15 minutes, the reaction mixture is heated to 90° C. and a water jet vacuum is applied at the same time. 19.2 g. of molten 1,4-dichloro-3,5-diaminobenzene are added at 90° C. and the mixture is poured into a preheated mould.

Tensile strength _____ 285 kg. wt./cm.$^2$.
Dimensional stability _____ 64 kg. wt. (Ring).
Shore hardness, DIN 53505 _____ 98.
Elasticity, DIN 53512 _____ 37.

A polyurethane elastomer which has the following properties is obtained from the free polyether after appropriate reaction:

Tensile strength _____ 171 kg. wt./cm.$^2$.
Dimensional stability _____ 30 kg. wt. (Ring).
Shore hardness, DIN 53505 _____ 87.
Elasticity, DIN 53512 _____ 41.

Example 10

Preparation of a hard polyurethane foam resin:

Component A:
- 75 parts by weight of 2-ethyl-hexylester of 4-chloro-3,5-diaminobenzoic acid,
- 25 parts by weight of a triamine which has been prepared by reacting isatoic acid anhydride with a polyether of hydroxyl number 56 which in turn was prepared by propoxylation of glycerol followed by ethoxylation (proportion by weight of propylene oxide to ethylene oxide=55:45),
- 1 part by weight of silicone stabilizer,
- 2.5 parts by weight of N-methyl-N'-(N,N-dimethylaminoethyl)piperazine, and
- 10 parts by weight of monofluorotrichloromethane are thoroughly mixed together.

Component B:
- 730 parts by weight of a polyether (dipropylene glycol and propylene oxide, OH number 148) are added dropwise to
- 660 parts by weight of 2,4-/2,6-toluylene diisocyanate (80:20) with stirring. The temperature rises to 50° C. The mixture is then heated to 80° C. and kept at this temperature until the NCO content is 17%.

113.5 parts by weight of component A and 153 parts by weight of component B are heated to 40° C. and introduced into a closed metal mould (dimensions of mould 500 x 200 x 10 mm.) from a dosing and mixing assembly. The temperature of the mould is 80° C. The reactive mixture starts to foam after 7 seconds and gels after a further 13 seconds. The product was removed from the mould after 10 minutes. It has a solid marginal zone and a cellular core.

Physical properties of the moulded product:

Elastic modulus according to the bending test (DIN (DIN 53423):

$$E_b = 2600 \text{ kg. wt./cm.}^2$$

Elongation at break according to the tension test:

$$\epsilon_z B = 77\%$$

Practical dimensional stability at elevated temperature under bending stress according to DIN 53424, bending tension approximately 3 kg. wt./cm.² at a flexure of 10 mm.:

$$WB_{10} = 136° \text{ C.}$$

Example 11

The procedure is the same as in Example 10 except that the free polyether with terminal hydroxyl groups is used instead of the polyether which has been esterified with isatoic acid anhydride, and 151 parts by weight of component B are used instead of 153 parts by weight.

Physical properties:

Elastic modulus according to bending test (DIN 53423):

$$E_b = 2600 \text{ kg. wt./cm.}^2$$

Elongation at break from tension test:

$$\epsilon_z B = 64\%$$

Dimensional stability at elevated temperature and bending stress according to DIN 53424, bending tension approximately 3 kg. wt./cm.² at a flexure of 10 mm.:

$$WB_{10} = 104° \text{ C.}$$

Example 12

100 parts by weight of polypropylene oxide dianthranilate (average molecular weight=1238) are mixed at 50 to 60° C. with 5 parts by weight of the isobutyl ester of 4-chloro-3,5-diaminobenzoic acid and 31 parts by weight of 4,4'-diisocyanatodiphenylmethane which contains carbodiimide (75% of the NCO groups converted into carbodiimide groups), and the mixture is poured onto a metal sheet which is at a temperature of 100° C.

The following values are obtained after 20 hours' storage at room temperature:

Tensile strength (DIN 53504) _____kg. wt./cm.²__ 218
Elongation at break (DIN 53504) _____percent__ 350
Shore hardness A (DIN 53505) _____ 92
Elasticity (DIN 53512) _____ 19

After 20 hours' storage at 110° C., the following properties are obtained:

Tensile strength (DIN 53504) _____kg. wt./cm.²__ 303
Elongation at break (DIN 53504) _____percent__ 360
Shore hardness A (DIN 53505) _____ 92
Elasticity (DIN 53512) _____ 16

Example 13

1000 g. (0.3 mol) of a tetrafunctional polyether prepared by propoxylation followed by ethoxylation (proportion by weight of alkylene oxides=80:20) of ethylenediamine (OH number 67) are reacted with 204 g. (1.25 mols) of isatoic anhydride and 5 g. of powdered sodium hydroxide at temperatures of 70° to 90° C. It is worked up as described in Example 1.

Yield: 960 g. $\triangleq$ 84% of the theory of brownish, viscous substance. Titration with N/10 HClO₄ shows that 99% of all OH groups originally present have been converted into anthranilic acid ester.

Example 14

1870 g. (0.475 mol) of a bifunctional polyether prepared by propoxylation followed by ethoxylation (proportion by weight of alkylene oxides=80:20) of β,β'-dihydroxy-N-ethyl-diethylamine (OH number 28.5) are reacted with 164 g. (1.05 mols) of isatoic anhydride and 5 g. of powdered sodium hydroxide as described in Example 13. The product is worked up as described in Example 1.

Yield: 1775 g. $\triangleq$ 89% of the theory of brown, viscous oil.

By titration with N/10 HClO₄ follows that in this case 90% of all the OH-groups originally present have been converted into anthranilic acid ester.

Example 15

1000 g. (0.158 mol) of a tetrafunctional polyether prepared by propoxylation followed by ethoxylation (proportion by weight of alkylene oxides=87:13) of ethylenediamine (OH number 35.5) are reacted with 106 g. (0.65 mol) of isatoic anhydride and 6 g. of powdered sodium hydroxide as described in Example 13 and worked up in a manner analogous to Example 1.

Yield: 930 g. $\triangleq$ 87% of the theory of a brownish, viscous liquid.

By titration with N/10 HClO₄ in glacial acetic acid follows that in this case 100% of all the OH-groups originally present have been converted into anthranilic acid ester.

Example 16

2000 g. (0.253 mol) of a tetrafunctional polyether prepared by propoxylation followed by ethoxylation (proportion by weight of alkylene oxides=87.25:12.75) of ethylenediamine (OH number 28.4) are reacted with 175 g. (1.07 mols) of isatoic anhydride and 5 g. of powdered sodium hydroxide as described in Example 13. It is worked up in a manner analogous to Example 1.

Yield: 1652 g. $\triangleq$ 75% of the theory of a light brown, viscous substance.

By titration with N/10 HClO₄ follows that 96% of all the OH-groups originally present have been converted into anthranilic acid ester.

Example 17

2000 g. (0.507 mol) of a bifunctional polyether consisting of propylene oxide which has been polymerized on β,β'-dihydroxy-N-stearoyl-diethylamine (OH number 28.5) are reacted with 176 g. (1.08 mols) isatoic anhydride and 5 g. of powdered potassium hydroxide at temperatures analogous to Example 13. It is worked up in a manner analogous to Example 1.

Yield: 1924 g. ≙ 91% of the theory of a brown viscous oil.

The terminal OH-groups are completely transformed into anthranilic ester groups following by titration with N/10 $HClO_4$ in glacial acetic acid.

Example 18

1000 g. (0.519 mol) of a bifunctional polyether prepared by propoxylation followed by ethoxylation (proportion by weight of alkylene oxides=80:20) of aniline (OH number 58.3) are reacted with 173 g. (1.06 mols) of isatoic anhydride and 5 g. of powdered sodium hydroxide as shown in Example 13. It is worked up in a manner analogous to Example 1.
Yield: 958 g. ∧ 85% of the theory of a brown viscous liquid.

Titration with N/10 $HClO_4$ shows that 98% of all OH-groups originally present have been converted into anthranilic acid ester.

Example 19

Preparation of a polyurethane foam resin:

100 parts by weight of the polyether with terminal amino groups described in Example 14,
3.5 parts by weight of water,
1.4 parts by weight of a catalyst consisting of 5% 2,2,4-trimethyl-2-sila-morpholine, 60% N-methyl-N'-(N,N-dimethylaminoethyl) piperazine, and 35% β,β'-dihydroxy-diethylamine,
0.1 part by weight $Sn^{2+}$-2-ethyl-hexoate, and
1.0 part by weight of silicone stabilizer were thoroughly mixed and 40 parts by weight of 2,4-/2,6-toluylene-diisocyanate (65:35) were added with vigorous stirring. The reaction mixture starts to foam after 10 seconds and gels after a further 48 seconds to give an elastic foram resin of die following properties:

Density (DIN 53420) _____ kg. wt./m.$^3$__ 28
Tensile strength (DIN 53571) _____ kg. wt./cm.$^2$__ 0.9
Elongation at break (DIN 53571) _____ percent__ 235

Example for comparison 100 parts by weight of the polyether with terminal OH-groups (starting material described in Example 14),
3.5 parts by weight of water,
0.7 part by weight of a catalyst consisting of 5% 2,2,4-trimethyl-2-sila-morpholine,
60% N-methyl-N-(N,N-dimethylaminoethyl) piperazine, and 35% β,β'-dihydroxy-diethylamine,
0.1 part by weight $Sn^{2+}$-2-ethyl-hexoate, and
1.0 part by weight of silicon stabilizer were thoroughly mixed and 39.5 parts by weight of 2,4/2,6-toluylene-diisocyanate (65:35) were added with vigorous stirring. The reaction mixture starts to foam after 7 seconds and gelations occurs after a further 45 seconds. The resulting polyurethane foam resin has a density of 37 kg. wt./m.$^3$, a tensile of 0.8 kg. wt./cm.$^2$ and an elongation at break of 100%.

Example 20

Preparation of a polyurethane foam resin according to invention:

100 parts by weight of the polyether with terminal amino groups described in Example 16,
3.5 parts by weight of water,
1.4 parts by weight of a catalyst consisting of 5% 2,2,4-trimethyl - 2-sila-morpholine, 60% N-methyl-N-(N,N-dimethylaminoethyl)piperazine and
35% β,β'-dihydroxy-diethylamine,
0.1 part by weight $Sn^{2+}$-2-ethyl-hexoate, and
1.0 part by weight of silicone stabilizer were thoroughly mixed and 37 parts by weight of 2,4-/2,6-toluylenediisocyanate (65:35) were added with vigorous stirring. The reaction mixture starts to foam after 12 seconds and gels after further 60 seconds to form a soft elastic polyurethane foam resin with following properties:

Density (DIN 53420) _____ kg. wt./m.$^3$__ 31
Tensile strength (DIN 53571) _____ kg. wt./cm.$^2$__ 1.0
Elongation at break (DIN 53571) _____ percent__ 220

Example for comparison 100 parts by weight of the poyether with terminal OH-groups (starting material described in Example 16),
3.5 parts by weight of water,
0.75 part by weight of a catalyst consisting of 5% 2,2,4-trimethyl - 2-silamorpholine, 60% N-methyl-N,(N,N-dimethylaminoethyl)piperazine, and 35% β,β'-dihydroxy-diethylamine,
1.0 part by weight of silicone stabilizer and
0.2 part by weight of $Sn^{2+}$-2-ethyl-hexoate were thoroughly mixed and 39.5 parts by weight of 2,4-/2,6-toluylene-diisocyanate (65:35) were added with vigorous stirring. The reaction mixture starts to foam after 10 seconds and gels after a further 60 seconds to give a soft elastic polyurethane foam, which has a density of 34 kg. wt./m.$^3$ a tensile strength of 1.0 kg. wt./cm.$^2$ and an elongation at break of 160%.

What is claimed is:
1. Compounds having terminal amino groups and the general formula

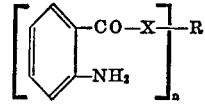

wherein $n$ is an integer of from 2 to 8,
X is oxygen or sulphur, and
R is an n-valent radical obtained by the removal of hydroxyl groups or mercapto groups from an n-valent polyalkylene ether polyol of molecular weight 600 to 10,000 or from an n-valent alkylene thioether polythiol of molecular weight 600 to 10,000 or from polyols and polythiols in the molecular weight range of 600 to 10,000, which have both polyether and polythioether segments.

2. A process for the preparation of organic compounds which contain terminal amino groups and having the general formula of claim 1 which consists essentially of reacting at temperatures from 30° C. to 150° C. a polyalkylene ether polyol or a polyalkylene thioether polythiol or polyols and polythiols which have both polyether and polythioether segments having a molecular weight about 600 to about 10,000 with at least an equivalent amount of isatoic acid anhydride in the presence of strong bases.

3. The process of claim 2 wherein polyalkylene ether polyol is a polyethylene polyether polyol.

4. The process of claim 2 wherein the polyalkylene ether polyol is a polypropylene ether polyol.

5. The process of claim 2 wherein the polyalkylene ether polyol is a polymer of tetrahydrofuran having terminal hydroxyl groups.

6. The process of claim 2 wherein the polyalkylene ether polyols have ethylene oxide and propylene oxide units in any sequence.

7. The process of claim 2, wherein the polyalkylene ether polyols contain both ether and thioether groups.

References Cited

UNITED STATES PATENTS 3,413,334  11/1968  Burkhardt et al. __ 260—471 R

LORRAINE A. WEINBERGER, Primary Examiner

L. A. THAXTON, Assistant Examiner

U.S. Cl. X.R.

260—77.5 AM, 77.5 CA, 471 R